No. 798,014. PATENTED AUG. 22, 1905.
W. H. COE.
MACHINE FOR DEPOSITING METALLIC LEAF IN RIGHT LINES UPON SURFACES
TO BE ORNAMENTED.
APPLICATION FILED AUG. 13, 1902.
5 SHEETS—SHEET 2.
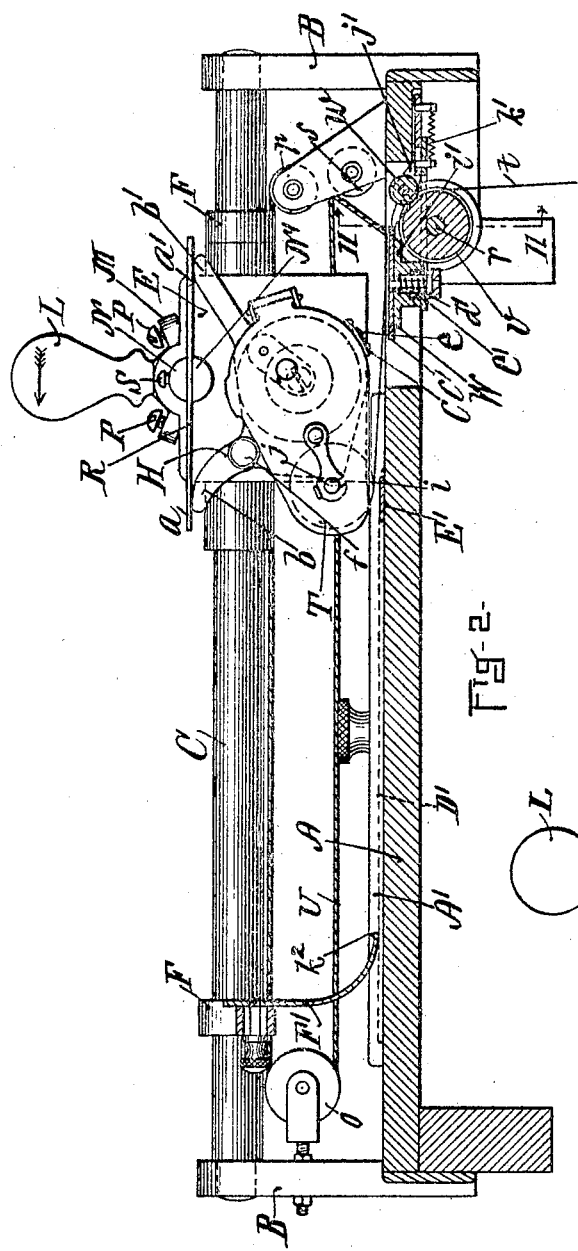
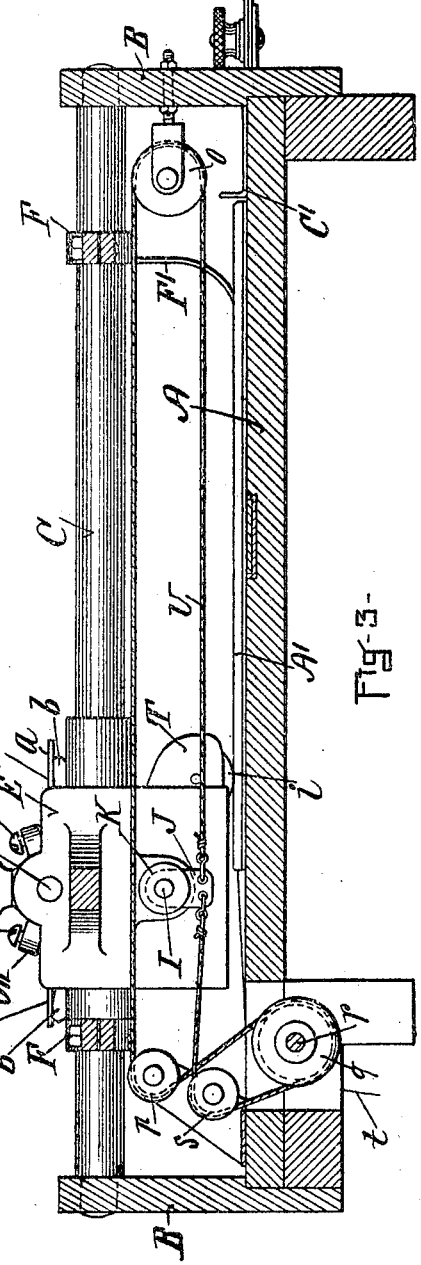

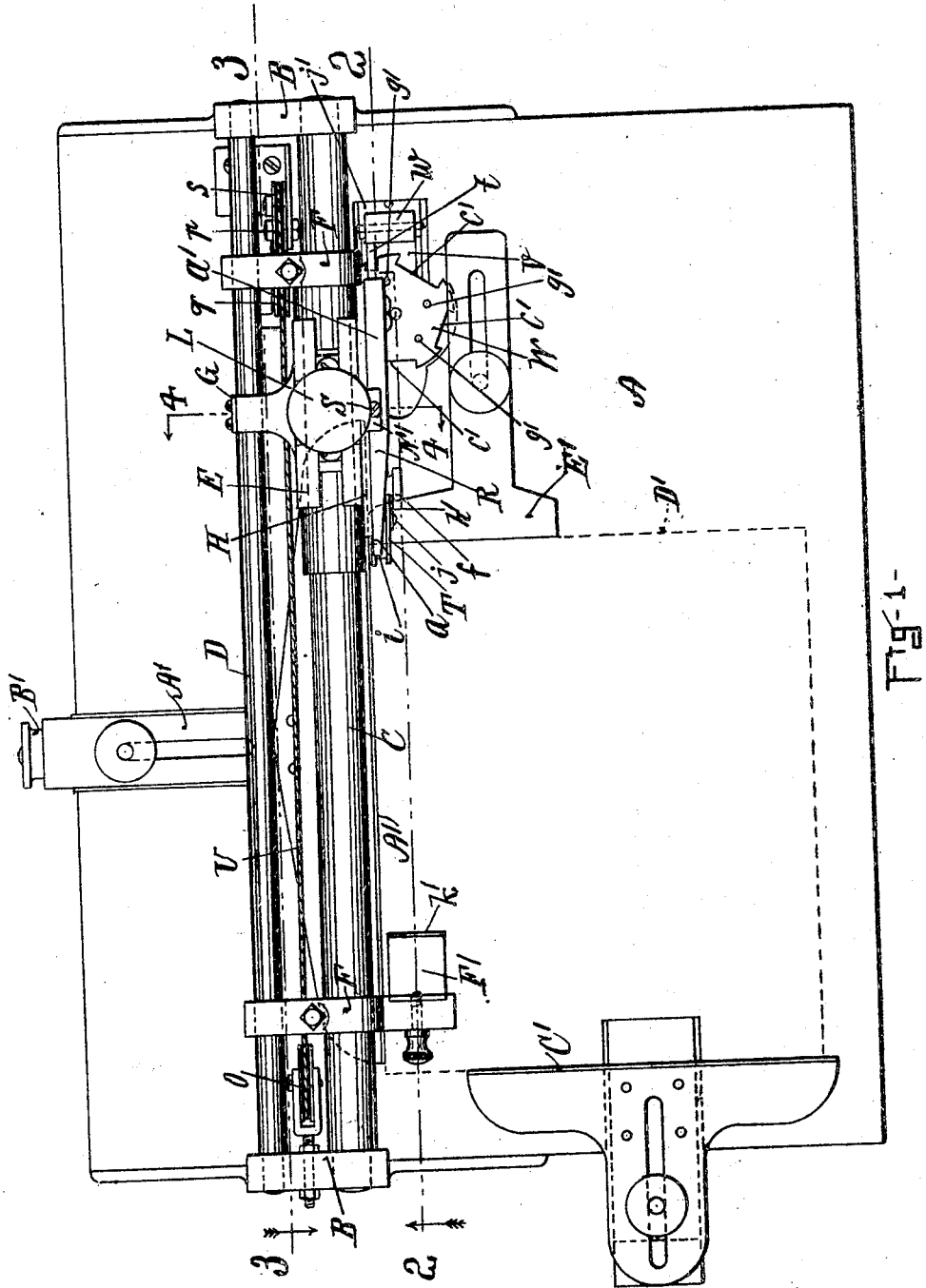

No. 798,014. PATENTED AUG. 22, 1905.
W. H. COE.
MACHINE FOR DEPOSITING METALLIC LEAF IN RIGHT LINES UPON SURFACES TO BE ORNAMENTED.
APPLICATION FILED AUG. 13, 1902.
5 SHEETS—SHEET 3.
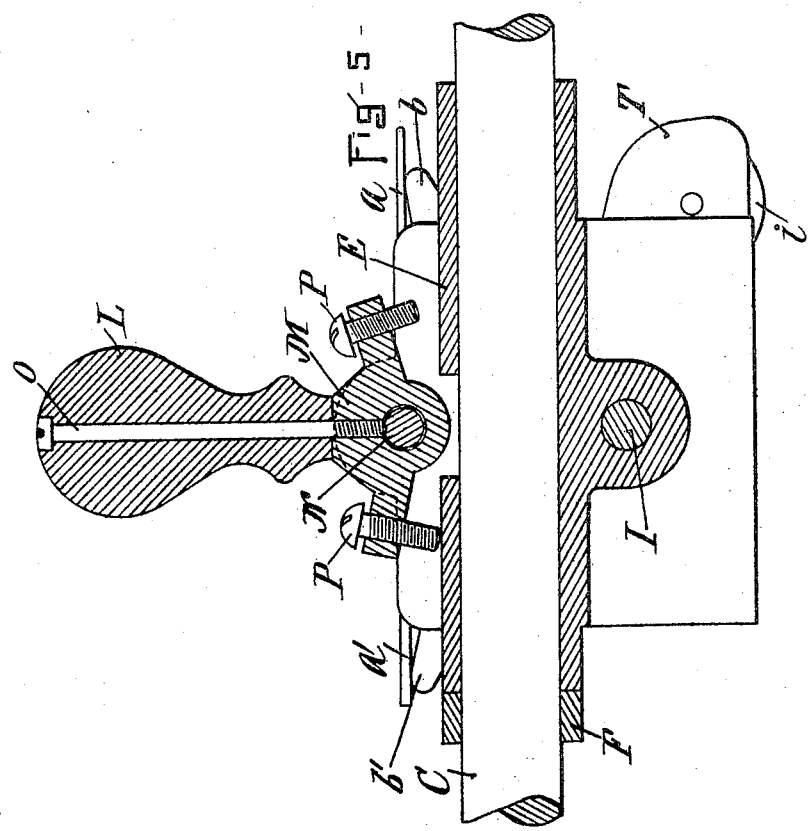
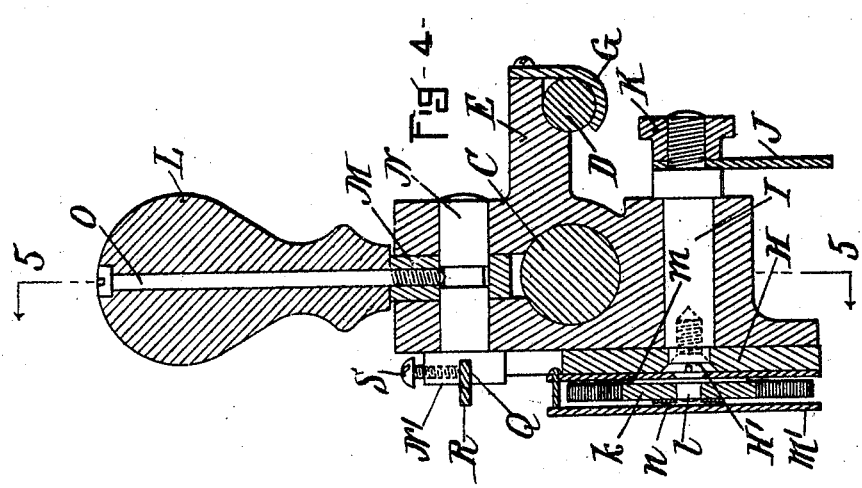

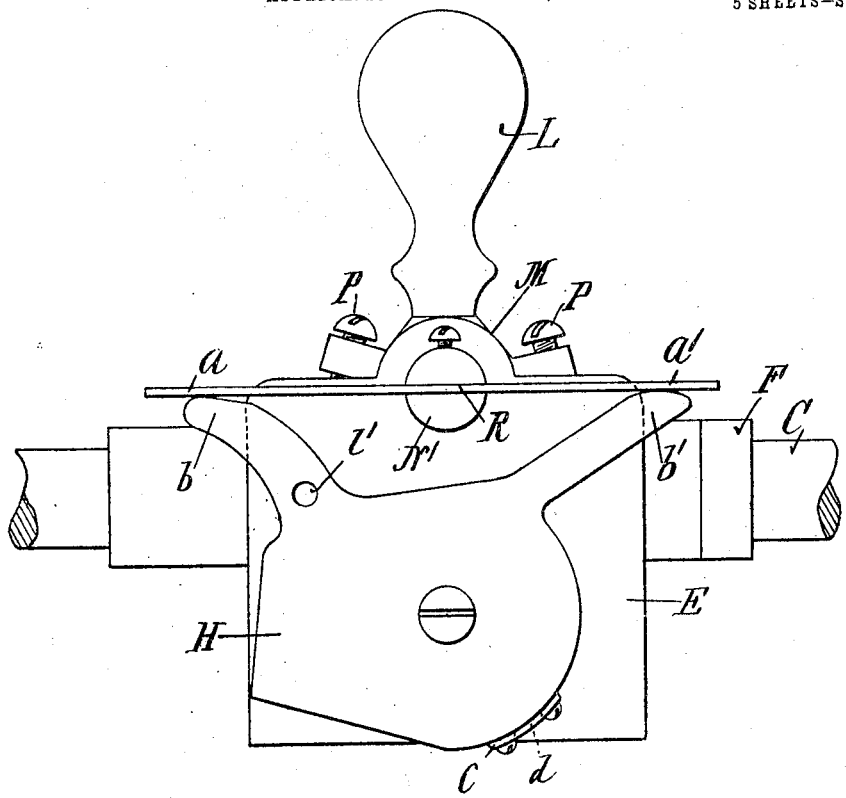
Fig-6-
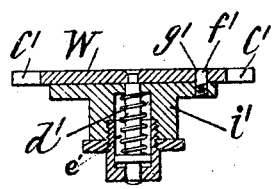
Fig-7-

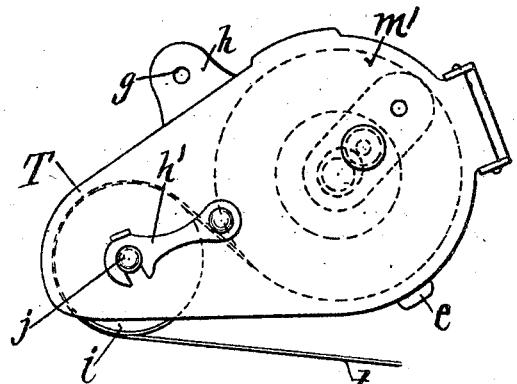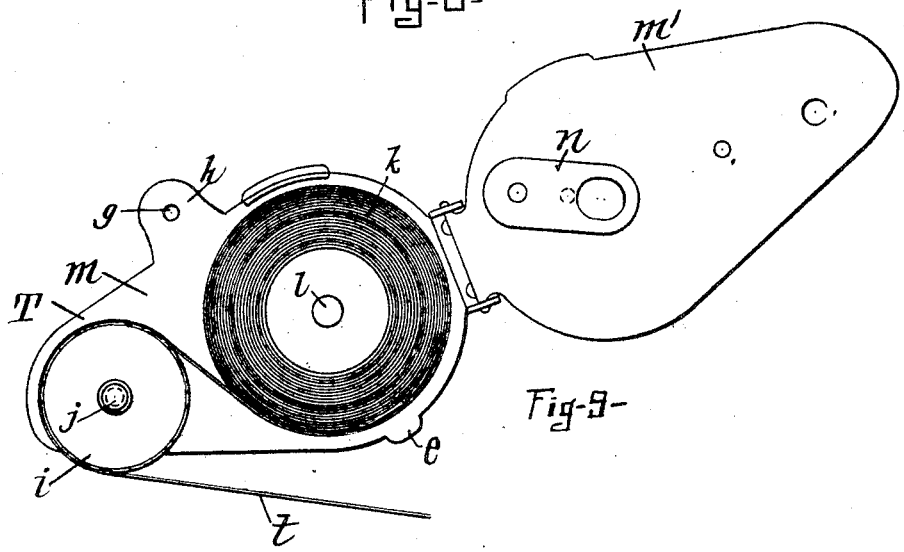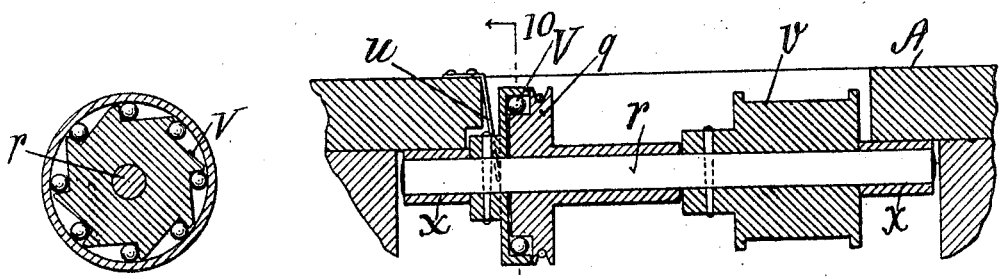

UNITED STATES PATENT OFFICE.

WALTER H. COE, OF PROVIDENCE, RHODE ISLAND.

MACHINE FOR DEPOSITING METALLIC LEAF IN RIGHT LINES UPON SURFACES TO BE ORNAMENTED.

No. 798,014. Specification of Letters Patent. Patented Aug. 22, 1905.

Application filed August 13, 1902. Serial No. 119,546.

*To all whom it may concern:*

Be it known that I, WALTER H. COE, a citizen of the United States, residing at Providence, in the State of Rhode Island, have invented a new and useful Improvement in Machines for Depositing Metallic Leaf in Right Lines upon a Surface to be Ornamented, of which the following is a specification.

The nature of my invention consists in the improved construction and arrangement of a machine for depositing metallic leaf in right lines from a package-roll of metallic leaf upon a surface to be decorated.

In the accompanying drawings, Figure 1 represents a top view of the machine. Fig. 2 represents a left-hand side view and section taken in the line 2 2 of Fig. 1. Fig. 3 represents a right-hand side view and a section taken in the line 3 3 of Fig. 1. Fig. 4 represents an enlarged detail section taken in the line 4 4 of Fig. 1. Fig. 5 represents a section taken in the line 5 5 of Fig. 4. Fig. 6 represents an enlarged side view of the carriage with the leaf-depositing arm removed. Fig. 7 represents an enlarged axial section of the pivoted changeable guide for guiding the expended paper strip. Fig. 8 represents a side view of the depositing-arm removed from the machine. Fig. 9 represents a side view showing the depositing-arm in its opened condition. Fig. 10 represents a section taken in the line 10 10 of Fig. 11, showing the ball-clutch employed for operating the rolls to take up the expended paper strip. Fig. 11 represents an enlarged detail section taken in the line 11 11 of Fig. 2, showing a portion of the take-up mechanism.

In the drawings, A represents the table of the machine, and B B the standards, which serve to support the longitudinal bars C and D, which together constitute a guiding-track for the sliding carriage E, which is adapted for movement back and forth between the adjustable stops F F. The carriage E is held to the bar D by means of the hook-formed piece G, (shown enlarged in Fig. 4,) and to the side of the carriage E is loosely held the rocking plate H, the said plate being secured to the end of the rock-shaft I by means of the screw H', and to the opposite end of the rock-shaft I is secured the pendent arm J by means of the nut K. The rocking handle L, by means of which the sliding carriage E is actuated, is secured to the rocking piece M and shaft N by means of the screw O, and the extent of the rocking movement of the handle L and shaft N is regulated by means of the adjusting-screws P P. The head N' of the rocking-shaft N is provided with the diametrical slot Q, in which is held the spring R, the said spring being firmly held in the said slot by means of the screw S. The opposite arms $a\ a'$ of the spring R bear upon the corresponding opposite arms $b\ b'$ of the rocking plate H, and by means of the said spring-arm $a$ the desired yielding movement may be imparted from the handle L to the rocking plate H. The side $m$ of the removable metallic leaf-depositing arm T is secured to the rocking plate H by means of the locking-piece $c$, which is attached to the lower edge of the said plate, the said locking-piece being provided with a slot $d$, adapted to receive the projecting lug $e$ of the side $m$, the said side being also fastened to the rocking plate by means of the knurled screw $f$, passing through a perforation $g$ made in the ear $h$ and screwing into the perforation $l'$ of the said rocking plate. The depositing-arm T is thus made removable from the plate H, and in the operation of the machine a series of depositing-arms T, adapted for holding package-rolls of different widths, may be readily substituted for each other. The delivering-roller $i$ is held to rotate upon the stud $j$, which projects from the side $m$ of the depositing-arm, and the package-roll $k$ is held to rotate upon the stud $l$, the side $m'$ of the depositing-arm being hinged to the side $m$ and held in its closed position by means of the hook $h'$, while a flat spring $n$ is arranged to properly friction the package-roll $k$ for unwinding movement.

To the pendent arm J of the take-up mechanism are secured the opposite ends of the band U, which passes from the arm J, around the tightening-pulley $o$, thence around the idler-pulley $p$, thence around the pulley $q$, which is loose on the shaft $r$, and thence around the idler-pulley $s$ to its opposite connection with the arm J. The pulley $q$ is provided with the ball-clutch V, by means of which the shaft $r$, which is supported in the bearings $x\ x$, is caused to rotate in the proper direction for taking up the expended paper strip $t$, and the shaft $r$ is frictioned to prevent forward movement upon the forward reversal of the movement of the carriage E and pulley $q$ by means of the friction-spring $u$. At the back of the take-up roller $v$ is placed the pressure-roll $w$, which serves to hold the paper strip $t$ in frictional engagement with the surface of the roll $v$ to draw the same backward upon the occasion of the backward movement of the carriage E. The pressure-roll $w$ is held upon a sliding frame $j'$, which is actuated in the forward direction by means of the compressed spiral spring $k'$. In order to properly guide the paper strip $t$ to the take-up rolls $v\,w$, so that package-rolls of gold-leaf of different widths may be successfully employed in the machine, a rotatable guide-plate W is employed, provided at its edge with notches $c'\,c'$ of different widths, the said plate being held down to a level with the plane of the surface of the table A by means of the spiral spring $d'$, inclosed in a chamber $e'$, which is formed in a connecting portion $i''$ of the table A, the said portion being provided with the upwardly-projecting pin $f''$, (shown in Fig. 7,) which pin is adapted to enter the guide-holes $g'\,g'$ of the guide-plate. The adjustment of the guide-plate W to suit any required width of paper strip is effected by raising the said guide-plate against the resilience of the spring $l'$ and moving it around until the pin $f''$ will enter the proper guide-hole $g'$, then allowing the spring to draw the guide-plate down to its seat.

The front edge of the article to be ornamented with a gilded right line is to be held against the gage A', which is made adjustable by means of the screw B', and a corresponding adjustable gage C' is provided at right angles to the gage A' for properly locating the article upon the table. I also provide an adjustable gage-plate E' of about the thickness of the article to be operated upon in order that the delivering-roller of the depositing-arm may move onto the surface of the said article from the same horizontal plane, thus avoiding imperfections in the gilded lines. To the forward limiting-stop F is attached the vertically-adjustable cutter F', having a cutting edge $k^2$.

In operating with the machine to mark a gilded line at the edge of a book-cover D' (represented by the dotted line upon the table A in Fig. 1) the said cover is to be first placed with its right-angled edges against the gages A' and C', and then the operator by pressing forward upon the handle L, as indicated by the arrow in Fig. 2, will first rock the delivering-roller $i$ down onto the surface of the gage-plate E', with the desired yielding pressure of the spring-arm $a$, and then the continued forward movement of the handle L will carry the carriage E forward along the guiding-track, the paper strip $t$ being at the same time firmly held against forward movement with the carriage by means of the take-up rolls $v\,w$ and the pressure-spring $u$, which serve to frictionally prevent the movement of the shaft $r$, to which the take-up roll $v$ is secured, and upon the continued forward movement of the carriage E the paper strip and metallic leaf will be unwound from the package-roll, and when the carriage E has reached the forward limiting-stop F the delivering-roller $i$ will have been raised upon the edge $k^2$ of the vertically-adjustable cutter F', which is attached to the said forward stop F, and the pressure of said delivering-roller upon the cutter will serve to so weaken the ribbon of gold-leaf that it will readily separate from the paper strip at the indented line upon the initial backward movement of the rocking handle L, which backward movement first serves to raise the delivering-roller and paper strip from the surface of the cover on which the gold-leaf has been deposited, and then upon the initial backward movement of the carriage E the backward movement of the band U will cause the engagement of the ball-clutch V, by means of which the rolls $v\,w$ will be operated to take up the expended paper strip until the carriage reaches the rearward stop F, and when the lined book-cover D' has been removed from the table and another substituted therefor and the handle L again pressed forward the initial action of the pendent arm J upon the band U will cause a slight take-up movement of the rolls $v\,w$ to take up the slack caused by the inclined downward movement of the delivering-roller $i$, thus serving to keep the paper strip in a uniform tight condition, so that the metallic leaf may at the initial forward movement of the carriage E be properly deposited upon the book-cover.

Instead of employing a delivering-roller upon the stud $j$ for depositing the metallic leaf an exteriorily-wound package-roll may be placed upon said stud and the metallic leaf deposited directly therefrom without a delivering-roller.

I claim as my invention—

1. The combination of a table or support for the article to be ornamented, the guiding-track, the carriage adapted for movement along the track, the depositing-arm connected to the carriage, means for supporting a package-roll of metallic leaf, with means for causing the arm to press the leaf upon the surface to be ornamented upon the movement of the carriage in one direction and for disengaging the paper strip from the deposited metallic leaf upon the movement of the carriage in the opposite direction, substantially as described.

2. The combination of a table or support for the article to be ornamented, the guiding-track, the carriage adapted for movement along the track, the depositing-arm connected to the carriage and means for supporting a package-roll of metallic leaf, with means for causing the arm to press the leaf upon the surface to be ornamented upon the movement of the carriage in one direction, and means for disengaging the paper strip from the deposited metallic leaf upon the movement of the carriage in the opposite direction and for drawing away the paper strip, substantially as described.

3. The combination of a table or support for the article to be ornamented, means for supporting the package-roll of metallic leaf, and the take-up rolls for drawing away the paper strip, with the guiding-track, the carriage adapted for movement along the track, the depositing-arm connected with the carriage, and means operated in conjunction with the downward movement of the depositing-arm, for imparting a slight movement to the take-up rolls, to take up the slack of the paper strip and its connected metallic leaf, substantially as described.

4. The combination of a table or support for the article to be ornamented, the guiding-track, the carriage adapted for movement along the track, the depositing-arm connected with the carriage, means for supporting a package-roll of metallic leaf, the rolls for taking up the paper strip upon the backward movement of the carriage, and the pivoted changeable guide-plate for guiding the paper strip to the take-up rolls, substantially as described.

5. The combination of a table or support for the article to be ornamented, the guiding-track, the carriage adapted for movement along the track, the depositing-arm connected to the carriage, and means for supporting a package-roll of metallic leaf, with means for pressing the leaf upon the surface to be ornamented upon the movement of the carriage in one direction, and a stationary cutter arranged to sever the metallic leaf at the end of the carriage movement, substantially as described.

6. The combination of a table or support for the article to be ornamented, the guiding-track, and the carriage adapted for movement along the track, with the depositing-arm connected with the carriage, the pivoted handle to operate the depositing-arm, and a yielding means between the handle and the depositing-arm, substantially as described.

WALTER H. COE.

Witnesses:
SOCRATES SCHOLFIELD,
CHAS. E. SMITH.